United States Patent [19]

Zajichek

[11] 4,189,952
[45] Feb. 26, 1980

[54] VEHICLE TRANSMISSION SHIFTING MECHANISM

[75] Inventor: William J. Zajichek, New Berlin, Wis.

[73] Assignee: Allis-Chalmers Corporation, Milwaukee, Wis.

[21] Appl. No.: 851,146

[22] Filed: Nov. 14, 1977

[51] Int. Cl.² .......................... G05G 5/10; G05G 9/16
[52] U.S. Cl. ................................................ 74/477
[58] Field of Search ........................ 74/473 R, 477

[56] References Cited

U.S. PATENT DOCUMENTS

| | | | |
|---|---|---|---|
| 2,029,485 | 2/1936 | Kesling | 74/477 X |
| 2,487,283 | 11/1949 | Stewart et al. | 74/477 |
| 2,503,893 | 4/1950 | Wahlberg | 74/477 X |
| 3,104,558 | 9/1963 | Herr, Jr. | 74/477 |
| 3,274,842 | 9/1966 | Huff | 74/477 X |

Primary Examiner—Allan D. Herrmann
Attorney, Agent, or Firm—Arthur L. Nelson

[57] ABSTRACT

A vehicle transmission shift lever remotely operating a shifting member on a transmission for shifting the transmission and an interlock for locking the transmission in its shifted position.

10 Claims, 13 Drawing Figures

VEHICLE TRANSMISSION SHIFTING MECHANISM

This invention relates to a vehicle transmission and more particularly to a shift lever for remotely operating a shifting member on the vehicle transmission which selectively engages a shift rail and gear ratio of the transmission in response to movement of the shift lever at the operator station. The shifting member automatically operates an interlock to lock the transmission in gear subsequent to shifting of the gear ratio by the shift lever at the operator station.

A tractor having an operating station with a platform allowing the operator to move about and particularly tractors with cabs preferably constructed with an uncluttered floor in the cab for the convenience of the operator. Preferably, the shift lever is mounted at a point to the side of the vehicle for convenient operation and to permit movement about the operator station. The transmission controls and hydraulic controls are localized in a control console for the convenience of the operator to assure control of the vehicle and implement by the operator. Preferably, the shift lever of this invention is pivotal for selectively engaging a shift rail and slidable for reciprocating the shift rail to engage the desired gear ratio. The motion initiated by the shift lever at the operator station is transmitted to a shifting arm on the transmission to shift the transmission. An interlock is automatically provided to the lock the transmission in gear once it is shifted to prevent the transmission from jumping out of gear when the vehicle is in operation.

Accordingly, it is an object of this invention to provide a shift lever and a shifting mechanism to remotely shift the vehicle transmission from the operator station.

It is another object of this invention to provide a remote shift lever for pivotally selecting a shift rail and slidably reciprocating the shift rail of the vehicle transmission.

It is a further object of this invention to provide a shift lever at the operator station for operating through a control linkage to shift the vehicle transmission and lock the gears in the shifted position by a automatic interlock in connection with the control linkage for shifting of the vehicle transmission in response to operation of the shift lever at the operator station.

The objects of this invention are accomplished by providing a shift lever at the operator station with a shift selecting mechanism and a shift engaging mechanism connected to a shifting member at the transmission to selectively shift gear ratios in the transmission. The shift lever initiates a pivotal and slidable movement transmitted to the shifting member to select and shift the desired gear ratio. An interlock connected to the shift engaging mechanism to lock the shift rail and the gears of the vehicle transmission in the engaged position.

Referring to the drawings, the preferred embodiment of this invention is illustrated.

The preferred embodiment of this invention is illustrated in the attached drawings and will be described subsequently.

Figure 1:
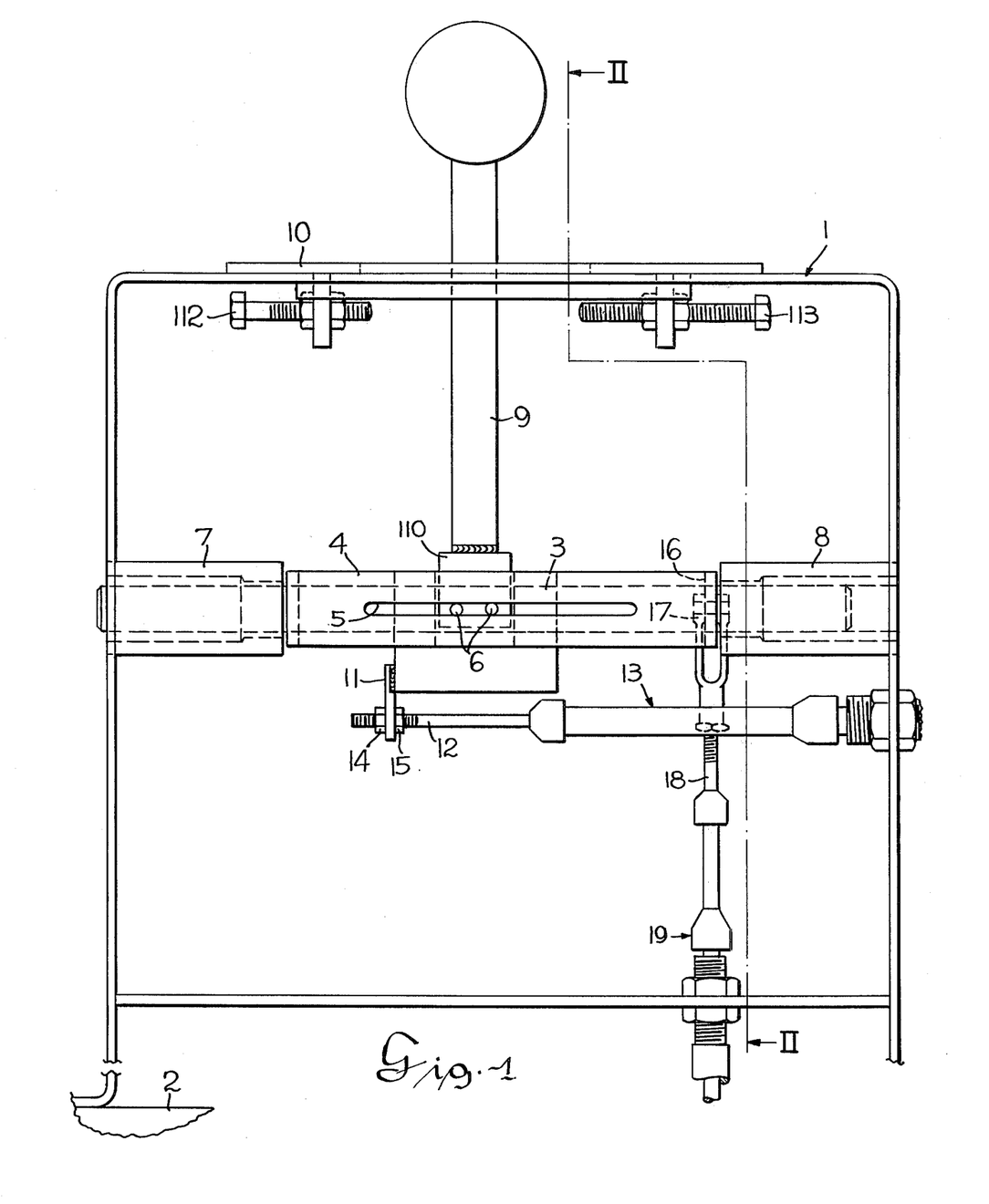
FIG. 1 illustrates a rear elevation view of the control console and the shift lever.
Figure 2:
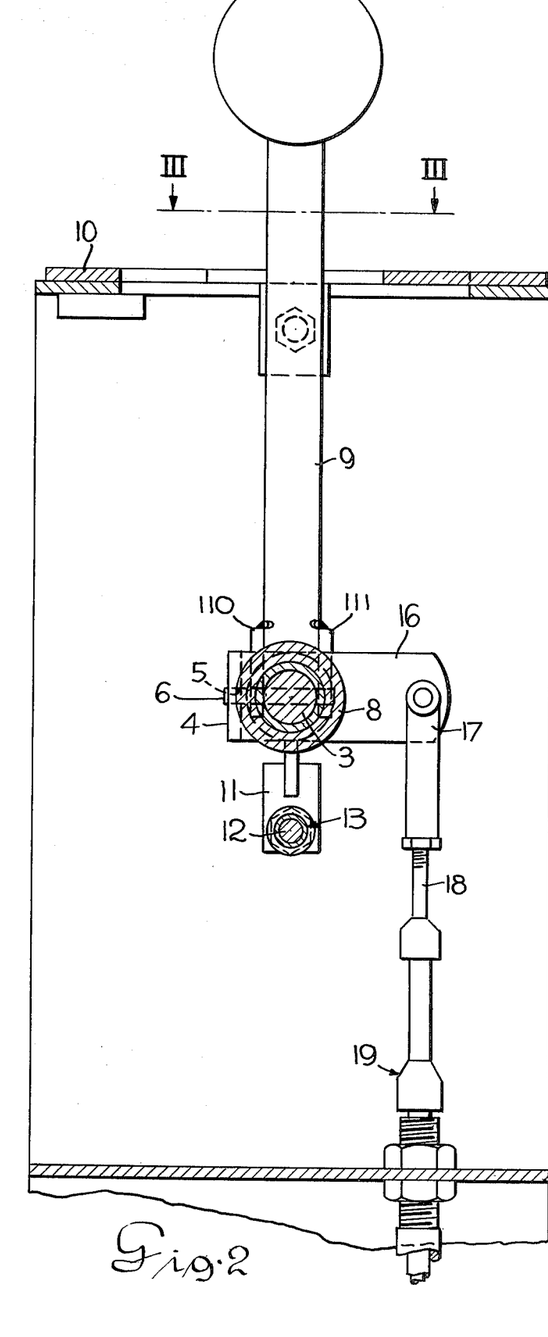
FIG. 2 illustrates a side elevation view of the shift lever and control console taken on line II—II of FIG. 1.
Figure 3:
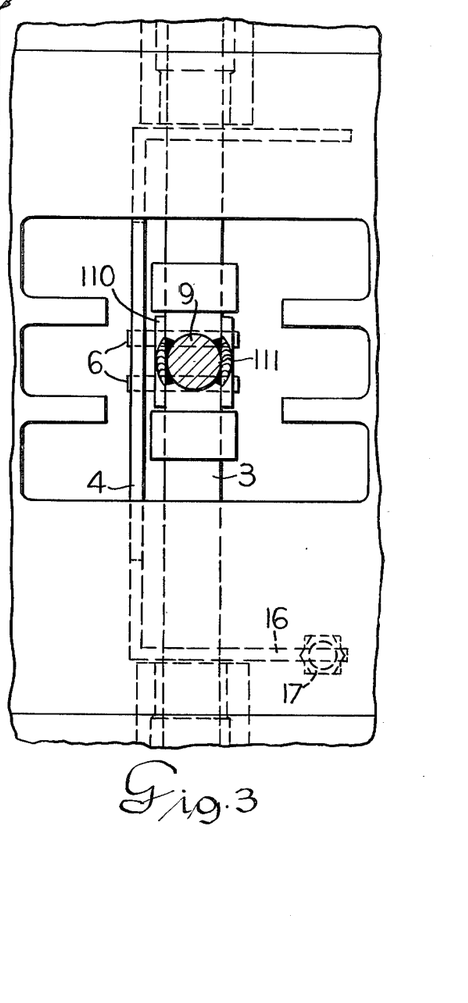
FIG. 3 is a top view of the control console and shift lever taken on line III—III of FIG. 2.

Referring to FIGS. 1, 2 and 3, the shift lever and control console are shown. The control console 1 is supported on the vehicle platform 2. The shaft 3 is slidably and rotatably mounted on the control console 1. The U-bracket 4 is formed with the slot 5 receiving pins 6 which fasten lever 9 to shaft 3 through the plates 110 and 111 to restrict relative rotation between the U-bracket 4 and shaft 3. The slot, however, permits the shaft 3 to slide in the U-bracket 4. The spacers 7 and 8 maintain the central position of the U-bracket 4 carrying lever 9 in the control console 1. The gate plate 10 and the adjustable stops 112 and 113 define the slidable and pivotal movement of the shift lever 9. The connector 11 is coupled to the shift lever 9 for fastening of the cable 12 of the sheathed cable 13. The nuts 14 and 15 attach the cable to the connector 11 to provide reciprocating movement of the cable 12 as the shift lever is slidably moved in the control console.

The arm 16 of the U-bracket 4 is connected to the shift lever 9 and is pivotally connected to the clevis 17 on the end of the cable 18 of the sheathed cable 19. As the lever 9 is pivoted, the arm 16 operates the cable 18.

Figure 4:
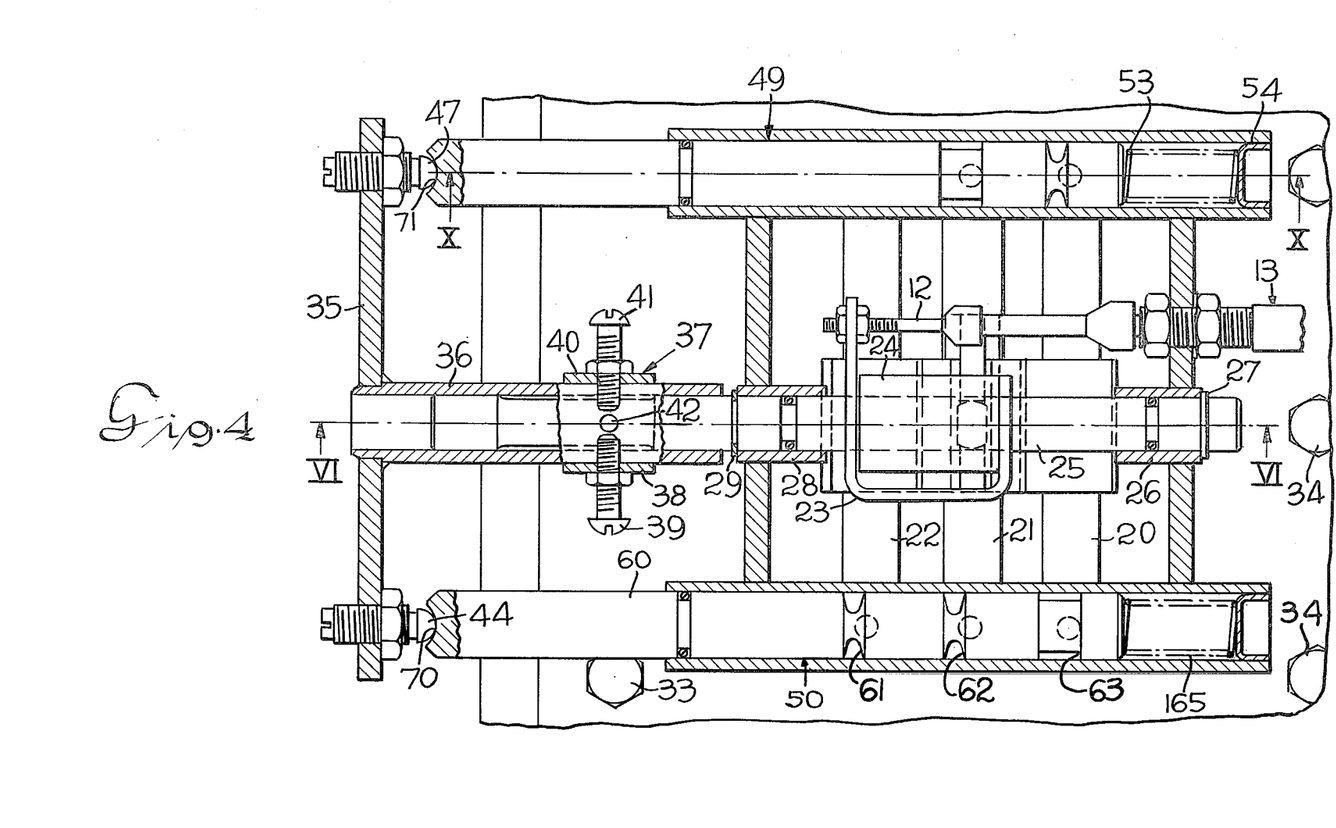
FIG. 4 is a top view partially in section of the shift engaging mechanism and shift selecting mechanism on the vehicle transmission.
Figure 5:
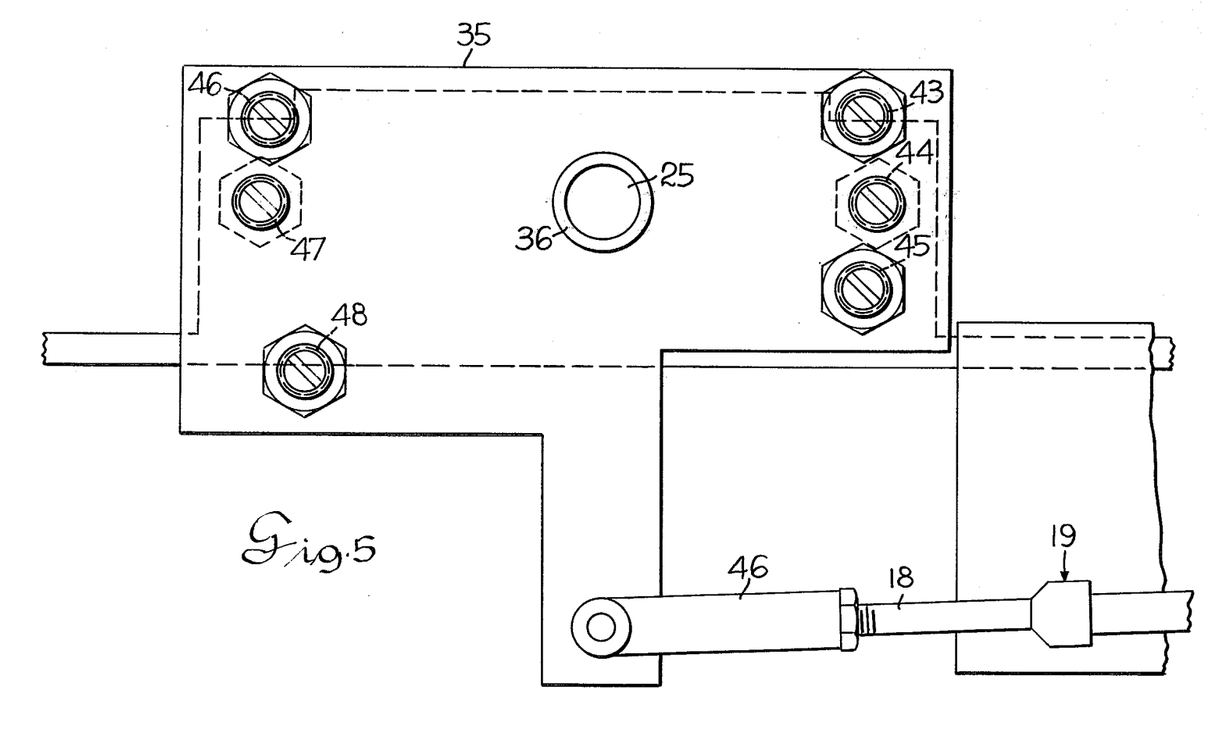
FIG. 5 is an enlarged side elevation view of the shifting mechanism on the vehicle transmission taken on line V—V of FIG. 6.

FIGS. 4 and 5 show the cables connected to a shift rail selecting and shifting mechanism on the vehicle transmission. Cable 12 of sheathed cable 13 selectively aligns shifting member 24 with one of the shift rails 20, 21 or 22. The carriage 23 guides the shifting member 24 on the shaft 25. The shaft 25 is mounted in the sleeve 26 and axial movement is limited by snap ring 27. The sleeve 28 also rotatably carries the shaft 25 and the snap ring 29 limits the axial movement of the shaft 25 in the opposite direction. The shifting member 24 is keyed by the key 30 to the shaft 25. The transmission cover 31 is bolted to the transmission housing 32 by the bolts 33 and 34. The shifting member 24 slides axially on the shaft 25 in response to movement of the cable 12. The shifting member 24 selectively engages the shift rails 20, 21 or 22.

The cam plate 35 is pivotally supported on the shaft 25 through the sleeve 36. The sleeve 36 carries the lost motion mechanism 37 which includes a plate 38 carrying the adjustable screw 39 and plate 40 carrying the adjustable screw 41. The pin 42 extends through the shaft 25 and sleeve 36. Lost motion is accomplished by setting the adjustable screws 39 and 41 to allow lost motion between the screws and pin 42.

Figure 10:
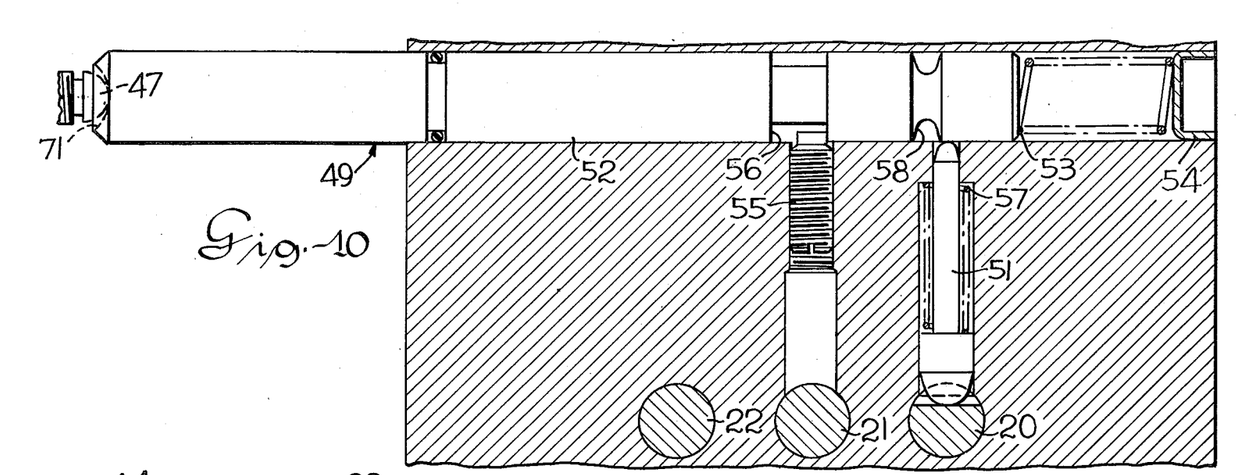
FIG. 10 is a section view through the shift rails and the front interlock spool taken on line X—X of FIG. 4.

The cam plate 35 carries a plurality of cam buttons 43, 44, 45, 46, 47, 48. The cable 18 of the sheathed cable 19 is connected through the clevis 46 to the cam plate 35. As the cam plate 35 is pivoted, the lost motion mechanism 37 pivots the shaft 25 and in turn reciprocates a selected one of the shift rails 20, 21 and 22. As the cam plate 35 is pivoted, it also operates the front interlock spool assembly 49 and the rear interlock spool assembly 50. The front interlock spool assembly 49 is operated by the cam buttons 46, 47 and 48 while the rear interlock spool assembly 50 is operated by the cam buttons 43, 44 and 45. FIG. 10 illustrates a cross section view of the front interlock spool and the interlock 51 locking the shift rail 20. The spool 52 is normally biased in the direction of the cam button 47 by the spring 53. The spring 53 is compressively positioned between the spring seat 54 and spool 52. The set screw 55 received in the annular recess 56 limits the reciprocating movement of the spool 52 in either of two directions. The cam buttons bias the spool in the righthand direction to compress the spring 53. The interlock pin 51 is normally biased downwardly by the spring 57 and the shift rail 20 engages the lower end of the interlock pin 51 and is received in the annular recess 58 as the shift rail is moved.

Figure 11:
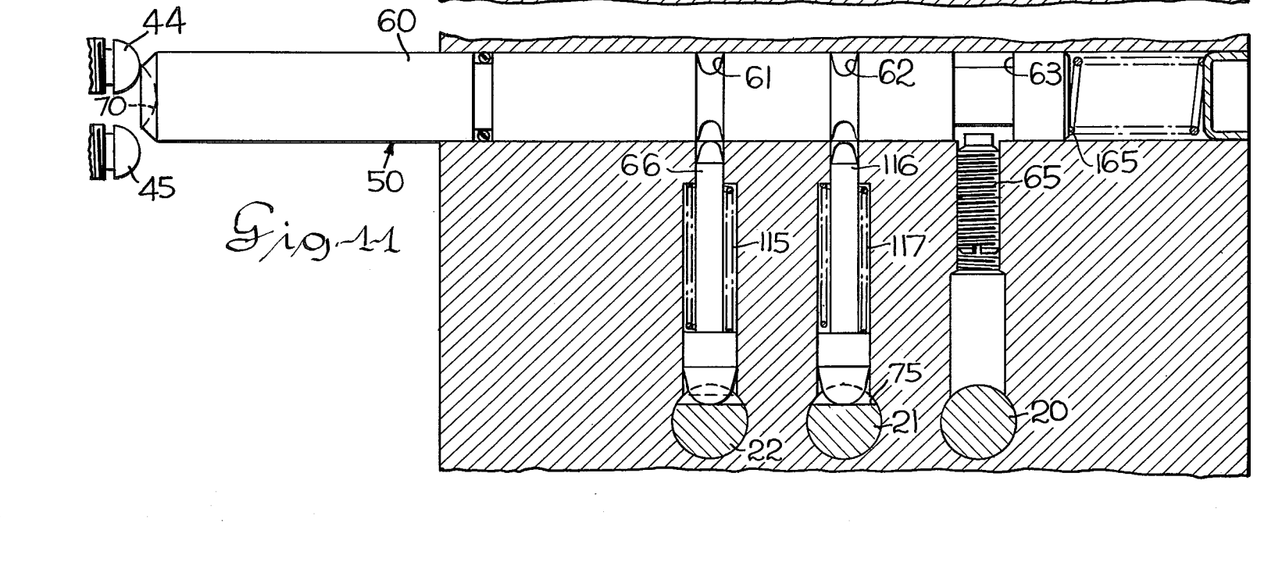
FIG. 11 is a section view of the rear interlock spool showing the interlocks for the shift rails in the released position.
Figure 12:
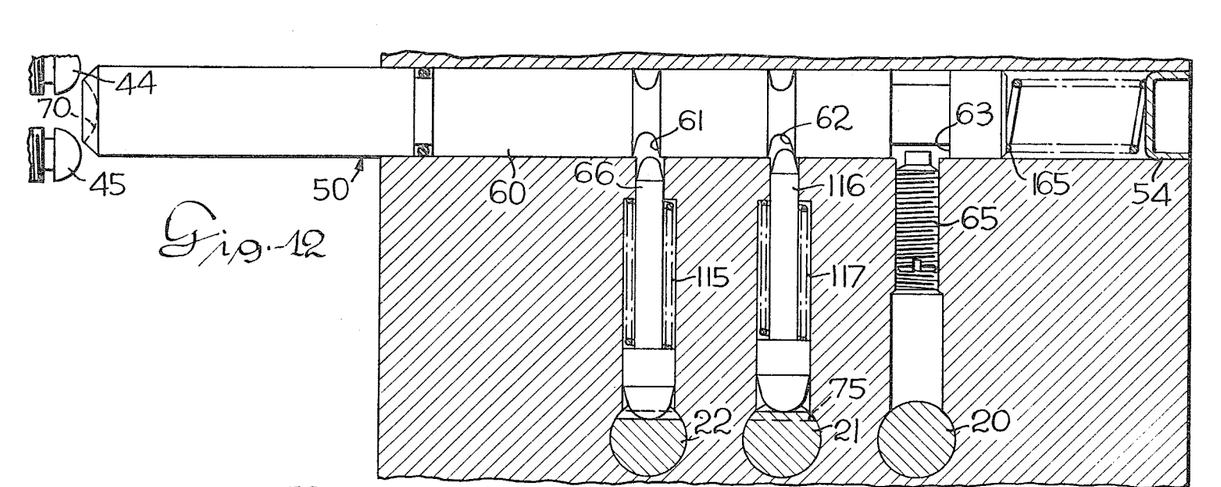
FIG. 12 illustrates the rear interlock spool in the mid-travel position.
Figure 13:
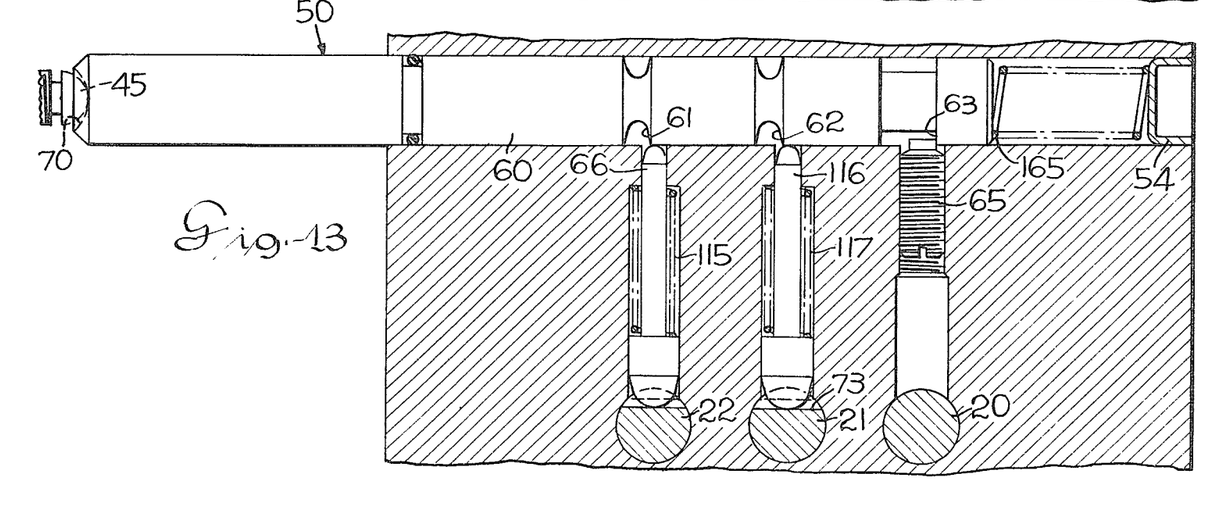
FIG. 13 is a section view of the rear interlock spool in the interlocked position locking the shift rails for the fourth and fifth speeds and the second and third speeds.

The interlock spool assembly 50 shown in FIGS. 11, 12 and 13 includes the spool 60 forming the annular recesses 61, 62 and 63. The annular recess 63 receives the set screw 65 to limit the reciprocating movement of the spool 60 in response to the button cams in the righthand direction and the spring 165 in the left-hand direction. Interlock pin 66 is biased in the downward direction by the spring 115 and in the upper direction by the shift rail 22. The interlock pin 116 is normally biased in the downward direction by the spring 117. The shift rail 21 moves the pin outwardly against the force of the spring 117 as the shift rail is reciprocated.

Figure 9:
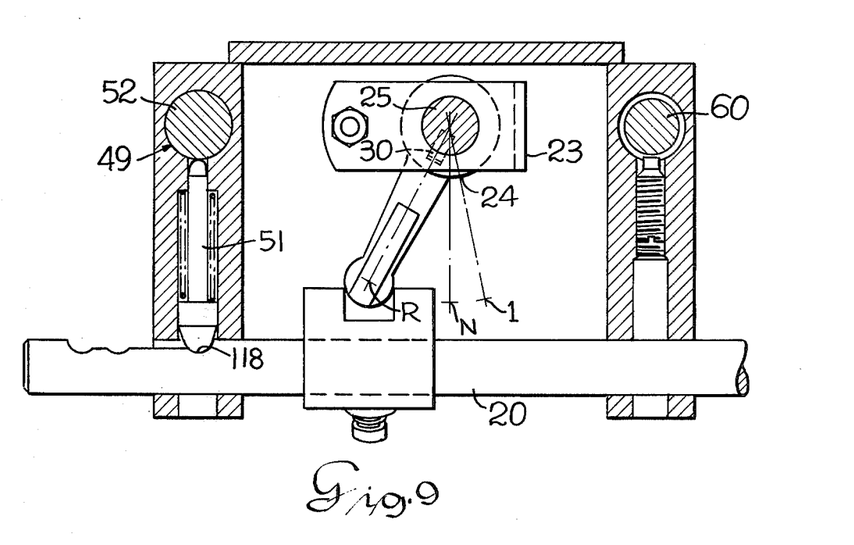
FIG. 9 is a cross section view taken through the shift rail for the first and reverse speeds and viewed on line IX—IX of FIG. 6.

FIG. 9 shows the shift rail 20 shifted to the reverse position by the shifting member 24. The interlock pin 51 locks the shift rail 20 in the shifted position as the pin 51 seats in the recess 118 of shift rail 20 and is solidly blocked by the outer diameter of the interlock spool 52.

Figure 7:
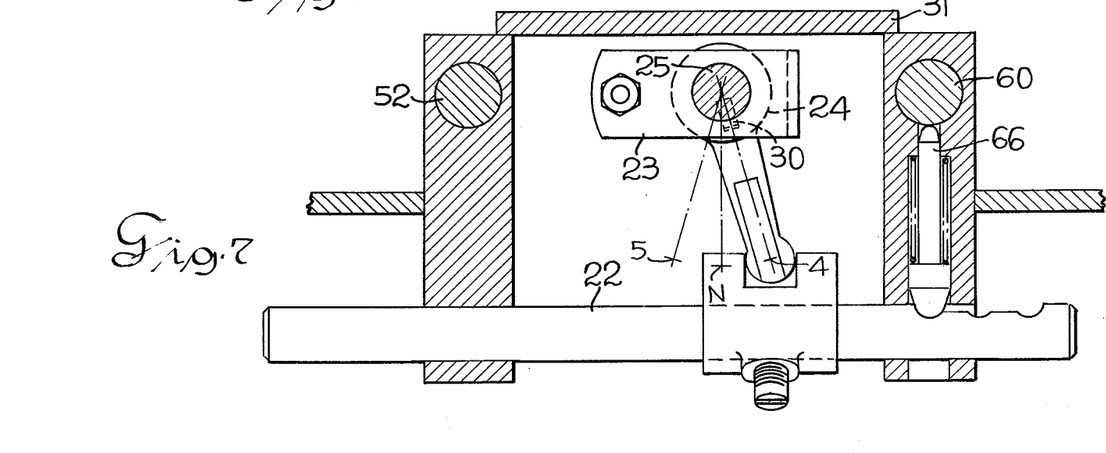
FIG. 7 is a cross section view taken through the shift rail for the fourth and fifth speeds and viewed on line VII—VII of FIG. 6.
Figure 8:
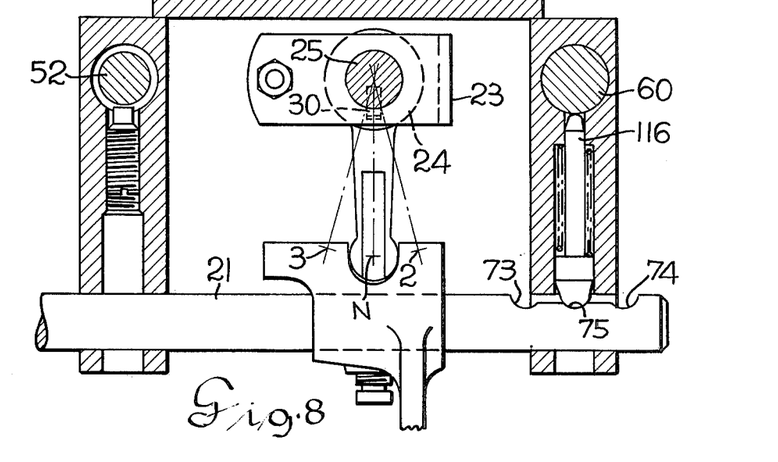
FIG. 8 is a cross section view taken through the centerline of the shift rail for the second and third speeds.

FIG. 8 shows the shift rail 21 in the neutral position as the interlock pin 116 locks the shift rail 21 in the neutral position. FIG. 7 shows the shift rail 22 in the fourth speed position and the interlock pin 66 locking the shift rail 22. Interlock spool 60 moves in response to the cam button 43 on the cam plate 35.

The operation of this device will be described in the following paragraphs.

Figure 6:
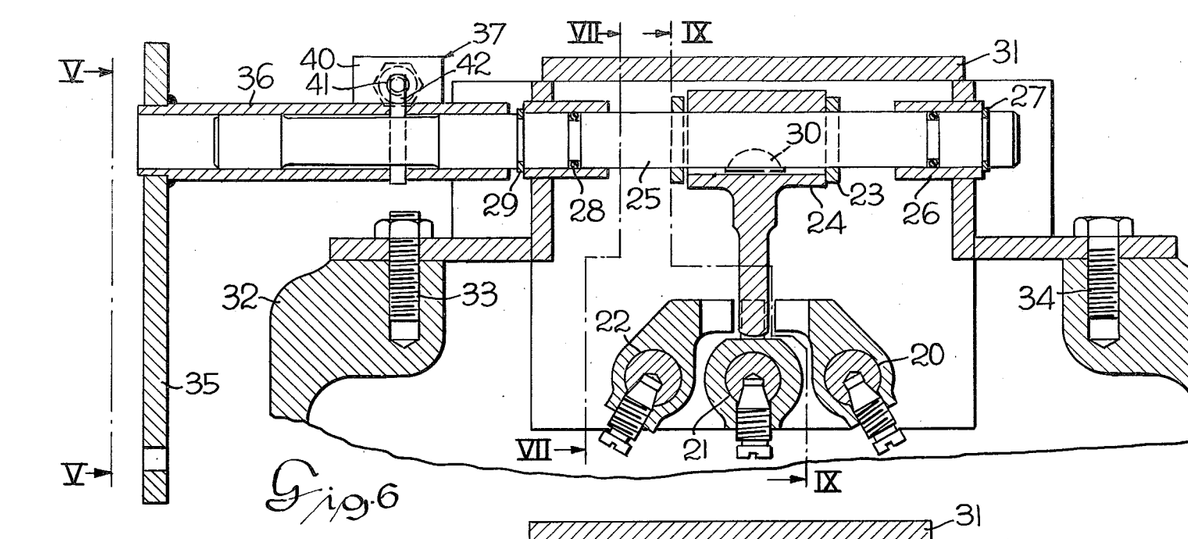
FIG. 6 is a rear cross section view of the shaft rail selector mechanism on the transmission taken on line VI—VI of FIG. 4.

The shift lever 9 can be slidably moved to one of three positions. Slidable movement of the lever selectively engages one of the three shift rails 20, 21 or 22. This is accomplished through the cable 12 which reciprocates the carriage 23 and selectively positions the shifting member 24 to engage a lug on a shift rail as indicated in FIG. 6. The shifting member in FIG. 6 is engaging shift rail 21 as shown. In order to shift the transmission, the shift lever 9 is pivotally moved on the shaft 3 from the neutral position. As the shift lever 9 is pivoted on the shaft 3, the cable 18 pivots the cam plate 35 as indicated in FIG. 5 to one of the shift positions.

The shift and detent lock cycle for shifting from neutral to second gear is typical and operates in the following manner. Button 44 is in the recess 70 of the interlock spool 60 and interlock 116 is in the recess 75 of the shift rail 21 as shown in FIG. 4. Initial counterclockwise rotation of the cam plate 35 causes button 44 to move the interlock spool 60 inwardly against the spring 165 positioning the annular recess 62 above the interlock 116 as shown in FIG. 11. Continued counterclockwise rotation of the cam plate 35 reciprocates the shift rail 21 and forces interlock 116 up into the recess 62 in spool 60 thus holding the spool 60 in inward position. Spool 60 is now clear of buttons 44 and 45 as shown in FIG. 12. Further counterclockwise rotation of the cam plate 35 causes button 45 to move the interlock spool inwardly allowing the spring interlock 116 to drop into the recess 73 of the shift rail 21 which has now reciprocably moved into position. Final counterclockwise rotation of the cam plate 35 moves the button 45 into the recess 70 of the interlock spool 60 allowing the spring 165 to move the spool 60 outwardly thereby locking the interlock 116 between the outside diameter of the spool 60 and recess 73 of the shift rail 21 as shown in FIG. 13.

When spool 60 engages button 43 or 45, the interlock pin 116 is initially released and then pin 116 locks the recess 73 or 74 depending on the direction of reciprocal movement of shift rail 21 when recess 70 engages button 44 or 45. The shift rail 21 is then locked in position and must remain in gear until released by manual operation of shift lever 9.

When the lever 9 is pivoted to the neutral position, the transmission is shifted into neutral as the cable 18 causes the cam plate 35 to rotate to a centered position. This in turn depresses the interlock spool 60 permitting the interlock pin 116 to move into the recess 62. Lost motion device 37 engaging the pin 42 causes the shaft 25 and shifting member 24 to rotate which in turn returns the shift rail 21 to the neutral position. When the shift rail 21 is in the neutral position, the interlock spring 117 forces the pin 116 out of the recess 62 where it engages the periphery of the spool 60 and locks the pin in the neutral recess 75 of the shift rail 21.

Accordingly, each shift rail is locked in its neutral position until it is manually released through the shift engaging mechanism. The shift engaging mechanism is operated by the shift lever. Each of the shift rails is released through the interlock spool and an interlock pin engaging the interlock spool and the shift rail selected. Once the shift rail is released, the lost motion mechanism 37 causes the shifting member 24 to shift the transmission into the selected gear ratio. When the shift rail is in the selected gear ratio, then the interlock pin again is forced out of the recess and the interlock spool causes the interlock pin to lock the shift rail in the shifted position. The reverse process releases the shift rail through the interlock pin and interlock spool and causes the shift rail to move to the neutral position as the shift lever is operated.

Accordingly, the shift lever is operated remotely from the transmission. This permits relative movement between the operator station and the transmission as well as providing a remote control for the transmission. Once the shift rail is shifted to engage the transmission in the desired gear ratio, the transmission is locked so that the gear cannot disengage by itself. The transmission can be disengaged only through movement of the hand lever 9. This is particularly advantageous when the vehicle is operating on hilly terrain since the vehicle engine is often used as a braking means in going downhill. The transmission provides five forward speeds and one reverse and the shift lever 9 selectively engages a shift rail and a speed ratio as indicated on the gate plate of the control console.

The embodiments of the invention in which an exclusive property or privilege is claimed are defined as follows:

1. A vehicle transmission shifting device comprising, a shift lever, means slidably and pivotally mounting said shift lever, a transmission including a shifting member and means slidably and pivotally supporting said shifting member, a gear ratio selector mechanism connected between said shifting member and said shift lever, a gear shifter mechanism connected between said shift lever and said shifting member, at least two shift rails slidably mounted in said transmission, said shift lever selectively and alternatively operating said shifting member for selective and alternative engagement of one of said shift rails, said shift lever selectively and alternatively operating said shifting member for reciprocating one of said shift rails for shifting the selected gear ratio of said transmission, an interlock mechanism including a camming device connected to said gear shifter mechanism, a plurality of cam followers, a plurality of interlock pins reciprocated by said cam followers in response to the operation of said gear shifter mechanism for selectively locking selected shift rails in the neutral position and in the gear engaging position.

2. A vehicle transmission shifting device as set forth in claim 1 wherein said gear ratio selector mechanism and said gear shifter mechanism comprise cables.

3. A vehicle transmission shifting device as set forth in claim 1 including three shift rails.

4. A vehicle transmission shifting device as set forth in claim 1 wherein each of said cam followers of said interlock mechanism includes an interlock plunger reciprocally operated in response to said gear shifter mechanism, an interlock pin engaging said interlock plunger to lock said shift rail in its gear engaging position.

5. A vehicle transmission shifting device as set forth in claim 1 wherein said means slidably and pivotally mounting said shift lever comprises a control console.

6. A vehicle transmission shifting device as set forth in claim 1 wherein said means slidably and pivotally mounting said shift lever comprises a control console, a gate plate defining an double "H" pattern defining the pivotal and reciprocal movement of said shift lever.

7. A vehicle transmission shifting device as set forth in claim 1 wherein each of said cam followers includes individual interlock pins on each of said shift rails.

8. A vehicle transmission shifting device as set forth in claim 1 wherein said camming device of said interlock mechanism includes a cam plate, a plurality of buttons on said cam plate, said cam followers include a plurality of interlock plungers for selective engagement with said buttons, interlocks pins operated by said plungers to selectively lock and release said shift rails in response to movement of said shift lever.

9. A vehicle transmission shifting device as set forth in claim 1 wherein said gear shifter mechanism includes a cable connected between said shift lever and said shifting member, said camming device includes a cam plate connected to said shifter mechanism for operating said interlock mechanism, a sleeve connected to said cam plate, a shaft slidably mounting said shifting member, a lost motion device connected between said sleeve and said shaft to operate said shifting member subsequent to initial operation of said interlock device to thereby release one of said shift rails and lock said shift rail subsequent to reciprocal movement of said shift rail to the shifted position.

10. A vehicle transmission shifting device as set forth in claim 1 including a sleeve connected to said interlock mechanism, a shaft mounted in said transmission slidably carrying said shifting member, an adjustable lost motion device for adjustably rotating said shifting member subsequent to initial operation of said interlock mechanism to release said shift rail from its neutral position and to subsequently lock said shift rail in its gear shift engaging position.

* * * * *